United States Patent [19]
Bennett et al.

[11] Patent Number: 5,919,536
[45] Date of Patent: *Jul. 6, 1999

[54] BIAXIALLY ORIENTED FILMS CONTAINING LAYERS OF POLYETHYLENE NAPHTHALATE BIBENZOATE (PENBB) AND PROCESS FOR THE PRODUCTION OF THESE FILMS

[75] Inventors: Cynthia Bennett, Alzey; Bodo Kuhmann, Runkel, both of Germany; Bennett Clayton Ward, Denver, N.C.; E-Won Choe, Randolph; John Anthony Flint, Berkeley Heights, both of N.J.

[73] Assignee: Mitsubishi Polyester Film GmbH, Wiesbaden, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/630,928

[22] Filed: Apr. 5, 1996

Related U.S. Application Data

[63] Continuation of application No. 08/127,891, Jul. 21, 1993.

[30] Foreign Application Priority Data

Jul. 22, 1992 [DE] Germany ............... 42 24 161
Nov. 12, 1992 [DE] Germany ............... 42 38 128

[51] Int. Cl.⁶ ............... B32B 1/08; B32B 27/18; B32B 27/36; B32B 31/00
[52] U.S. Cl. ............... 428/35.5; 428/35.2; 428/36.92; 428/323; 428/328; 428/329; 428/330; 428/331; 428/338; 428/339; 428/480; 428/694 ST; 428/694 SL; 428/910; 528/302; 528/305; 528/308; 528/308.6; 264/290.2
[58] Field of Search ............... 428/480, 323, 428/331, 910, 35.2, 35.5, 36.92, 328, 329, 330, 339, 694 ST, 694 SL; 528/302, 305, 308, 308.6, 308.7; 264/288.4, 289.3, 290.2, 210.2, 210.7

[56] References Cited

U.S. PATENT DOCUMENTS 2,976,266  3/1961  Lytton et al. ............... 260/75
3,008,934  11/1961  Wielicki et al. ............... 260/75

(List continued on next page.)

FOREIGN PATENT DOCUMENTS 0 202 631  11/1986  European Pat. Off. .
0378031  7/1990  European Pat. Off. .

(List continued on next page.)

OTHER PUBLICATIONS

Schmitz, Peter et al, "Films" Ullmann's Encyclopedia of Industrial Chemistry, 5th Ed., vol. All., pp. 85–100, 1988.

*Primary Examiner*—Vivian Chen
*Attorney, Agent, or Firm*—Foley & Lardner

[57] ABSTRACT

Biaxially oriented films containing at least one layer of polyethylene naphthalate bibenzoate (PENBB) copolyester wherein the copolyester contains from about 60 to about 40 mol % of a first recurring unit of the formula (II).

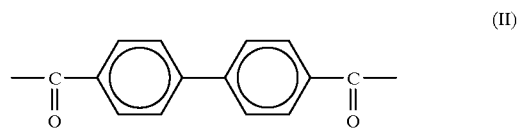

and about 40 to about 60 mol % of a second recurring unit of formula (I).

The copolyester preferably contains less than 10 mol % of recurring units derived from terephthalate or other dicarboxylic acids. The films have a total thickness of 0.05–500 μm and may contain inert particles.

27 Claims, 1 Drawing Sheet

U.S. PATENT DOCUMENTS

| | | | |
|---|---|---|---|
| 3,937,754 | 2/1976 | Shimotsuma et al. | 260/860 |
| 4,082,731 | 4/1978 | Knopka | 260/757 |
| 4,092,289 | 5/1978 | Remmington | 260/40 R |
| 4,101,528 | 7/1978 | Knopka | 260/45.75 R |
| 4,118,372 | 10/1978 | Schaefgen | 528/190 |
| 4,619,869 | 10/1986 | Kiriyama et al. | 428/480 |
| 4,990,900 | 2/1991 | Endo et al. | 428/331 |
| 5,093,064 | 3/1992 | Utsumi et al. | 264/210.7 |
| 5,139,727 | 8/1992 | Utsumi et al. | 264/210.7 |
| 5,164,439 | 11/1992 | Sakamoto et al. | 524/425 |
| 5,178,943 | 1/1993 | Asai et al. | 428/330 |
| 5,453,321 | 9/1995 | Choe et al. | 428/364 |
| 5,674,589 | 10/1997 | Bennett et al. | 427/149 |

FOREIGN PATENT DOCUMENTS

| | | |
|---|---|---|
| 0386707 A2 | 9/1990 | European Pat. Off. . |
| 0488603 A2 | 6/1992 | European Pat. Off. . |
| 57-18923 | 11/1982 | Japan . |
| WO 90/10027 | 9/1990 | WIPO . |
| 93/02122 | 2/1993 | WIPO . |

OTHER PUBLICATIONS

Werner, Eberhard et al., "Polyester, Films" Encyclopedia of Polymer Science & Engineering, vol, 12, pp. 193–216, 1988.

Japanese Patent Abstract 54/095634 (Toyobo) (Jan. 1978).
Japanese Patent Abstract 50/135333 (Teijin) (Apr. 1974).
Japanese Patent Abstract 02/038422 (Toyobo) (Feb. 1990).
Japanese Patent Abstract 01/139811 (Teijin) (Jun. 1989).
Japanese Patent Abstract 03/252449 (Teijin) (Nov. 1991).

FIG. 1

BIAXIALLY ORIENTED FILMS CONTAINING LAYERS OF POLYETHYLENE NAPHTHALATE BIBENZOATE (PENBB) AND PROCESS FOR THE PRODUCTION OF THESE FILMS

This application is a continuation, of application Ser. No. 08/127,891, filed Jul. 21, 1993, pending.

BACKGROUND OF THE INVENTION

1. Field of the Invention

The present invention relates to a biaxially oriented film having at least one layer where at least one layer of the biaxially oriented film is composed virtually exclusively of polyethylene naphthalate bibenzoate (PENBB).

2. Description of Related Art

In the field of carrier films for magnetic recording materials, such as video tapes, there is a continuous need to accommodate more data in a smaller space. To this end it is necessary, on the one hand to reduce the thickness of the carrier film even further, and thus to increase the tape length for a given cassette volume. On the other hand, it is necessary to use new coatings having a higher write density, such as ME (=metal evaporated) coatings or "perpendicular recording", the application technique for which signifies exposure of the carrier film to higher temperatures.

The same demands for smaller film thicknesses and increased temperature stability also are made in the case of capacitor dielectrics. This offers advantages with respect to the space utilization of the capacitor and in the soldering operation.

It is possible to reduce the thickness of the carrier film, however, only if the film has an improved specific mechanical stability (modulus of elasticity) both in the longitudinal and in the transverse directions for a constant thickness. Conventional carrier films made of polyethylene terephthalate (PET) reach the limit of mechanical stability at a thickness of about 7 $\mu$m. Recently, attempts have been made to replace PET carrier films by films made of polyethylene naphthalate (PEN). It is true that, compared with PET, PEN has a higher mechanical stability (in the case of "balanced" films, for example, modulus of elasticity values of up to about 8 GPa for PEN when composed to values of about 6 GPa PET films), but the thermal stability of the film is only slightly higher. Films can be produced from polyphenylene sulfide (PPS) which, although they have a higher stability to heat than PEN films, the PPS films have a mechanical stability which is lower than PEN films, and even somewhat lower than that of a PET film.

There have been numerous attempts to replace PET by copolyesters for use as fiber materials. Thus, a number of publications describe copolyesters made of ethylene terephthalate/naphthalate or ethylene terephthalate/bibenzoate (for example JP 54/095634 (Toyobo), JP 02/038422 (Toyobo), JP 01/113811 (Teijin), EP-A-0 202 631 (Teijin). In JP 03/252449 (Teijin), copolyesters are described in which the dicarboxylic acid component is selected from, Inter alia, terephthalic acid, naphthalene-2,6-dicarboxylic acid and 4,4'-dicarboxydiphenyl and the diol component is derived from ethylene glycol and resorcinol. Because of their terephthalate content, which is still fairly high, films made from these materials cannot provide any substantial improvement in mechanical stability and thermal stability. In JP 50/135333 (Teijin), fiber materials are described which are made of a copelyester of polyethylene naphthalate with 0.5 to 20% bibenzoate (derived from 4,4'-dicarb-oxydiphenyl). According to the teaching of this document, a bibenzoate content higher than 20% is disadvantageous because the melting point of the resulting polymer is too low.

U.S. Pat. No. 3,008,934 describes fiber- and film-forming copelyester compositions, which contain 4,4'-bibenzoic acid as acid-derived components. The publication does not mention biaxially oriented films produced from these materials. In light of the present expert knowledge in this field, it is indeed very unlikely that a person skilled in the art would have used the copolyesters described therein for producing biaxially oriented films. U.S. Pat. No. 3,008,934 states that pure polyethylene-4,4'-bibenzoate has an extraordinarily high crystallization rate. This fact would have led the skilled artisan away from producing biaxially oriented films containing bibenzoate, especially in the high amounts taught therein (40–90% by weight) because a premature crystallization leads to rapid embrittlement of the film even during the production process. Thus, premature crystallization leads to film tears even before biaxial orientation is achieved.

Fibers comprised of PENBB with a bibenzoate content of 0.5 to 20% are disclosed in JP 50/135333 (Teijin). There was skepticism in the art that films, in particular biaxially oriented films, could be prepared from these compositions for the same reasons as described above (premature crystallization). In this regard, the requirements for fiber production are less stringent since a uniaxial fiber orientation can be carried out much faster than a biaxial film orientation.

The fact that biaxially oriented films having improved mechanical and thermal properties can be prepared at all with bibenzoate contents above 20% is surprising in light of the teachings of JP 50/135333 (melting point lowered too greatly with bibenzoate content of above 20%) and U.S. Pat. No. 3,008,934.

Fibers made from PENBB polymers are described in U.S. application Ser. No. 07/735,553 abandoned. This application also proposes the production of films from these polymers, but contains no disclosure with respect to the thickness of the film. There is a need in the art to produce thin films for use in magnetic tapes and capacitor dielectrics.

Thus there continues to be a need for films which are more rigid and more resistant to heat especially for the production of thinner magnetic tapes and capacitor dielectrics.

SUMMARY OF THE INVENTION

It is therefore an object of the present invention to provide a film which is rigid and resistant to heat. It also is an object of the present invention to provide a film which is useful in magnetic tapes, capacitor dielectris, packaging, supports for printed circuits, reprographic film and the like. It is a further object of the present invention to provide a process for making a polyester film which is rigid and resistant to heat.

In satisfying these and other reality apparent objectives of the present invention, there is provided a biaxially oriented film having at least one layer, and having a total thickness of 0.05 to 500 $\mu$m, preferably of 0.1 to 400 $\mu$m and in particular of 0.5 to 200 $\mu$m. The biaxially oriented film contains a copolyester which contains at least one unit of the formula as a recurring unit derived from dicarboxylic acid. The recurring unit makes up at least 25 mol % of the recurring units derived from dicarboxylic acid which are present in the copolyester. The biaxially oriented film has exceptionally good specific rigidity values (i.e., mechanical stability) and high thermal stability.

In particular, it has been found that the biaxially oriented films of the present invention have particularly good mechanical stabilities when the copolyester also contains, in addition to the unit of the formula further recurring units derived from dicarboxylic acid of the formulae and/or the recurring unit of the formula making up at least 25 mol % of the recurring units derived from dicarboxylic acid which are present in the copolyester.

In addition, it has been found that copolyester-containing biaxially oriented films of the present invention have excellent mechanical stabilities when the copolyester contains less than 10 mol % (based on the recurring units derived from dicarboxylic acid which are present in the copolyester) of recurring units of the formula and the content of recurring units of the formula is at least 5 mol %, preferably at least 10 mol % based on the recurring units derived from dicarboxylic acid which are present in the copolyester.

An additional embodiment of the invention provides a biaxially oriented film having at least one layer which has a total thickness of 0.05 to 500 μm, at least one layer of this film being composed of a polymer of the recurring units -(A-B)- and 0 to 10% by weight of additives, the two components A and B being present in the polymer in approximately equal molar proportions, where component A is made from:

1 to 99 mol % of the recurring unit of the formula I

(I)

99 to 1 mol % of the recurring unit of the formula II

(II)

and 0 to 10 mol % of one or more recurring units A' selected from and $C_{1-6}$-alkyldicarboxylic acids, with the proviso that the sum of the constituents of the formula I, II and A' does not exceed 100 mol %, and component B is made from:

90 to 100 mol % of the recurring unit of the formula III

$$-O-(CH_2)_n-O- \quad (III)$$

where n is an integer within the range of from 2 to 6, and 0 to 10 mol % of one or more recurring units B', selected from $-O-(CH_2)_m-O-$ where m is an integer within the range of from 2 to 6, preferably 2 to 4, and m≠n, where r is an integer within the range of from 2 to 6, and preferably 2 to 4, endo and/or exo where R is H or $C_{1-4}$ alkyl, where X is $-CH_2-$, $-C(CH_3)_2-$, $-O-$, $-S-$, $-C(CF_3)_2-$, or $-SO_2-$ and The layer further can contain 0 to 10 mol % of a recurring unit C, which is selected from:

and hydroxy-$C_{1-6}$-alkylcarboxylic acids, in each case one recurring unit C replacing one recurring unit A and one recurring unit B.

In achieving the foregoing objectives, there also is provided a method of making a biaxially oriented polyester film where a copolyester such as those described above and from 0 to 10% by weight of additives are extruded through a die either as a single layered film, or co-extruded as a multi-layered film. This film then is stretched at least once longitudinally and at least once transversely to the direction of transport. The longitudinal and transverse stretching can take place simultaneously or succesively. The stretched film then preferably is heat set. These films are useful for a variety of purposes including, inter alia, a carrier for magnetic recording medium, a capacitor dielectric, a sail or sail window, a packaging material, a reporgraphic film, an insulating film for transformers, electric motors and cables, a parting film, a support for flexible printed circuits and as a film keyboard.

DETAILED DESCRIPTION OF PREFERRED EMBODIMENT

Many of the copolyesters described above as useful in the biaxially oriented films of the invention are disclosed in U.S. Pat. No. 3,008,934, which is incorporated herein by reference. U.S. Pat. No. 3,008,934 is very comprehensive with respect to the dicarboxylic acid and diol units which are used to make the copolyester. Thus, the copolyesters useful in the present invention can be made in accordance with the known methods described therein.

The biaxially oriented film according to the invention can be made of a single-layer or any number of multi-layers. Preferably, it is a single-layered film and contains 25 or more mol % of bibenzoate. In the case of multi-layer films, it is preferred that at least one layer is composed virtually exclusively of PENBB. The other layers can either also be composed of PENBB or else of another thermoplastic, such as PET, PEN, PPS, polyolefins such as polypropylene or polyamides.

Throughout this description composed "virtually exclusively" of PENBB denotes that additives or impurities, such as catalyst residues, processing auxiliaries, winding auxiliaries, stabilizers, antioxidants, plasticizers or lubricants, can also be present in a small amount, in addition to PENBB. Usually, these additives (impurities) are present in a concentration of at most 10% by weight, preferably 0.01 to 5% by weight and in particular 0.1 to 2% by weight. The catalyst residues can be, for example, antimony trioxide or tetralkoxytitanates. Processing auxiliaries or lubricants which can be used are siloxanes, in particular polymer dialkyl- or diaryl siloxanes, salts and waxes, as well as longer chain ($C_{\geq 8}$) organic carboxylic acids, esters and ethers (both aliphatic, aromatic and/or perfluorinated) in amounts of up to 1%.

Winding auxiliaries which can be used are, for example, pigments. Stabilizers are understood to be, for example, phosphorus compounds, such as phosphoric acid or phosphoric acid esters, and lubricants which can be used are, for example, fatty acids and their esters, PTFE waxes or polydiorganosiloxanes. In addition, viscosity modifiers and substances for modifying the melting point ($T_m$) or the glass transition temperature ($T_g$), or those which influence the crystallization kinetics or degree of crystallization, also can be used, if desired.

The viscosity modifiers can be, for example, polybasic carboxylic acids or their esters, such astrimesic acid or trimellitic acid, or polyhydric alcohols, such as ethylene glycol or glycerol. These compounds are either admixed into the finished polymer or, preferably, added in the desired amount as copolymerization constituents during the preparation of the polymers. Determining the amount and the manner of introducing these additives during the preparation of the polymer is within the routine skill of those skilled in the art.

In addition, solid particles can be added to the polymer, either before or during the polymerization, or subsequently to the finished polymer. Such particles are preferably used in order to alter the surface characteristics of the films. According to the invention, for example, kaolin, talc, $SiO_2$, $MgCO_3$, $CaCO_3$, $BaCO_3$, $CaSO_4$, $BaSO_4$, $Li_3PO_4$, $Ca_3(PO_4)_2$, $MG_3(PO_4)_2$, $Al_2O_3$, LiF or the Ca, Ba, Zn or Mn salts of terephthalic acid, or carbon (carbon black) can be added. However, it is also possible to add particles based on crosslinked, non-fusible organic polymers, such as, for example, polystyrenes, polyacrylates or polymethacrylates. Preferably, the particles are used in a concentration of 0.01 to 1% by weight, more preferably in a concentration of 0.05 to 0.8 and most preferabaly 0.1 to 0.8% by weight based on the total weight of the layer. The average particle size typically is 0.001 to 10 $\mu$m, and preferably 0.001 to 3 $\mu$m.

The polymer (copolyester) of the present invention is obtained by a polycondensation reaction of the corresponding acid and alcohol components. The two components should be present in approximately equal molar ratios. In order to influence the reaction kinetics or to serve as solvent, one of the two components, preferably the diol, can also be used in excess. The polycondensation reaction is carried out in accordance with conventional procedures, by using, for example, as starting materials, 100 mol % of the corresponding dicarboxylic acids and/or dicarboxylic acid dialkyl esters, such as dicarboxylic acid dimethyl or diethyl ester, and $\geq$100 mol % of the diol.

These starting materials are initially heated to about 200° C., if appropriate, in the presence of a transesterification catalyst until sufficient methyl alcohol or ethyl alcohol has distilled off to form a low molecular weight oligoester or polyester. This low molecular weight polyester then can optionally be subjected to polycondensation in a second step at a reaction temperature of about 240 to 25° C. up to the melting point of the polyester, if appropriate in the presence of a catalyst, to yield a higher molecular weight polyester. Catalysts which can be used are the catalysts conventionally used for polycondensation reactions, such as polyphosphates, triorganyl phosphates, antimony trioxide or tetraalkoxytitanates(IV), or, for example, mixtures of triphenylphosphorus and antimony trioxide. Those skilled in the art are familiar with the methods of making and using the various catalysts described above. The process for preparing these polymers is described in, for example, U.S. Pat. No. 3,008,934, and U.S. patent application Ser. No. 07/735,553, abandoned herein incorporated by reference. In order to achieve a further increase in the molecular weight, a solid phase polycondensation reaction can be carried out at temperatures below the melting point of the polymer under vacuum, dry air or inert gas.

The copolyester of the single-layer or multi-layer, biaxially oriented film according to the invention can contain at least two different recurring units derived from dicarboxylic acid, one of which units is a recurring unit of the formula II

(II)

which is present in the copolyester in an amount of at least 25 mol % based on the recurring units derived from dicarboxylic acid which are present in the copolyester. Further recurring units derived from dicarboxylic acid which can be used include any units of this type conventionally known, for example those of the formulae (1)

and/or

If the content of recurring units derived from terephthalate is less than 10 mol % based on the recurring units derived from dicarboxylic acid which are present in the copolyester, the content of recurring units of the formula II can be less than 25 mol %. However, it is preferably at least 5 mol % and more preferably at least 10 mol %. The copolyester -(A-B)-composed virtually exclusively of PENBB is a particularly preferred copolyester.

The finished polymer $-(A-B)_x-$ (where x is the average chain length) predominantly contains the recurring units of the formulae I and II which are derived from naphthalene-2,6-dicarboxylic acid (formula I) and, respectively, 4,4'-bibenzoate(4,4'-dicarboxyddiphenyl) (formula II), as the dicarboxylic acid component.

Figure 1:
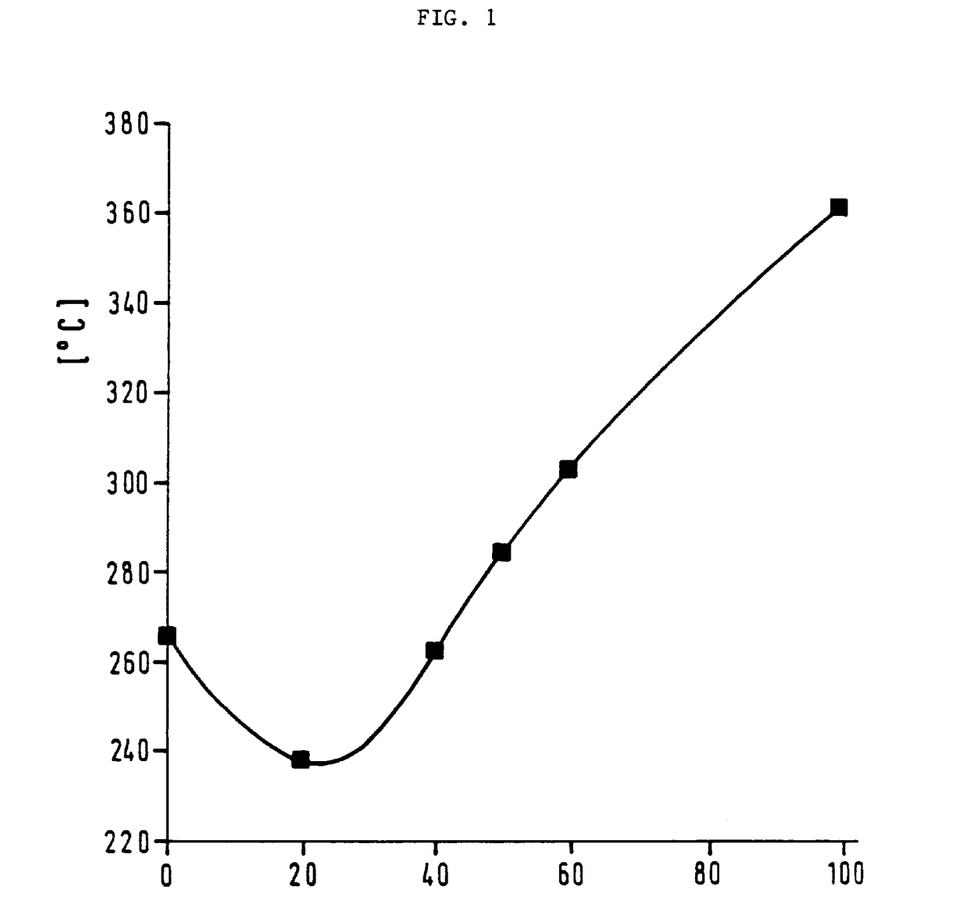
FIG. 1 illustrates the relationship between the proportion of 4,4'-bibenzoic acid and the melting temperature of the resulting polymer.

The dicarboxylic acid component A also can contain small amounts of acid components A' of a related type, such as, for example, and $C_{1-6}$-alkyldicarboxylic acids, to modify the melting point $T_m$ and the glass transition temperature $T_g$ or in order to influence the crystallization kinetics. Preferred acid components A' are:

Surprisingly, it has been found that, contrary to the teaching of JP 50/135333 (Teijin), polymers which have a bibenzoate content (formula II) of >20 mol %, and in particular >25 mol %, show no further lowering of the melting point. On the contrary, the melting point rises again as the bibenzoate content increases (see FIG. 1). For this reason, preferred films are those which contain layers which are predominantly made of a PENBB which has a bibenzoate content (formula II) of ≧25 mol %, in particular 25–90 mol % and very particularly preferably 40–60 mol %. It is surprising that films having this relatively high bibenzoate content can still be subjected to biaxial orientation.

The finished polymer -(A-B)$_x$-, predominantly contains the recurring unit of the formula III —O—(CH$_2$)$_a$—O— where n is an integer within the range of from 2 to 6, preferably 2 to 4 and particularly preferably 2, as diol component B.

However, if appropriate, diol components of a related type of the formula B' also can be used, such as, for example, —O—(CH$_2$)$_m$—O— where m is an integer within the range of from 2 to 6, preferably 2 to 4, and m≠n, where r is an integer within the range of from 2 to 6, preferably 2 to 4, endo and/or exo where R is H or $C_1$–$C_4$-alkyl where X is —CH$_2$—, —C(CH$_3$)$_2$—, —O—, —C(CF$_3$)$_2$—, —S— or —SO$_2$— and or any desired mixtures of these recurring units. Diol components of the formula B' can also be present in small amounts in addition to the recurring unit of the formula III of up to 10 mol % based on 100 mol % of the diol component B, i.e. the sum of the molar proportions of the components of the formula III and those of the formula B' totals 100 mol %. Preferably, the molar proportion of component B' is within the range of from 0–3 mol %.

In total, the acid component A content is 100 mol %. This 100 mol % is distributed between the components of the formula I, II and, where appropriate, A'. The component of the formula I is present in proportions of 1 to 99 mol %; the difference between this and 100 mol % corresponds to the proportion of the component of the formula II, so that this is present in proportions of 99 to 1 mol %. Optionally, if a component of the formula A' is also present, the proportion of this component will be deducted from the proportion of the component of the formula I and/or that of the component of the formula II. The proportion of the component of the formula A' is at most 10 mol %, and the sum of all components I, II and A' together is 100 mol %.

If appropriate, for example in order to influence the crystallization kinetics, the melting point or the glass transition temperature, some of the dicarboxylic acid and diol components (A and B) can be replaced by hydroxycarboxylic acid components C. Stoichiometrically one hydroxycarboxylic acid replaces one diol component and one dicarboxylic acid component. The polymer -(A-B)$_x$- also can contain, for example, recurring units of the formula C as hydroxycarboxylic acid components C.
The recurring unit is preferred.

The hydroxy acid component C is present in molar proportions of 0 to 10%, based on the acid component A. Preferably, the molar proportion of component C is 0–3 mol %.

If necessary, the benzene or naphthalene rings can be substituted both in the acid component A and also in the diol component B and the hydroxy acid component C. Substituents which can be used are one or more radicals such as $C_1$–$C_6$-alkyl, $C_1$–$C_5$-alkoxy, halogen (chlorine, bromine or iodine), CN, $NO_2$, $CF_3$ or phenyl. The substituents on acid component A, diol component B and hydroxy acid component C may be the same or different.

The inherent viscosity (i.v.) of the polymer -(A-B)$_x$- is greater than or equal to 0.5 dl/g, in particular 0.55 to 1.7 dl/g. The inherent viscosity usually is measured at a concentration of 0.1 g/dl or 0.2 g/dl in pentafluorophenol/hexafluoroisopro-panol [volume ratio 1:1] at 25° C. If i.v. values of >1.0 g/dl are expected, the concentration is 0.1 dl/g, in all other cases the concentration is 0.2 g/dl. The average chain length x in -(A-B)$_x$- preferably is within the range of from about 30 to about ≦400. The number-average molecular weight $M_n$ is between 10,000 and 100,000, and preferably between 20,000 and 50,000.

Surprisingly, it has been found that biaxially oriented films made of the above-described copolyesters are distinguished by excellent gas barrier properties, an extremely low water absorption, a very favorable course of the dielectric loss factor up to temperatures above 150° C., and excellent UV stability.

The film according to this invention is produced using any one of the known processes, for example, the casting or coagulation process or the extrusion process. If the film is produced by the casting or coagulation process, care has to be taken to prevent crystallization prior to the orientation treatment. Generally, casting and coagulation processes are considerably more expensive than extrusion processes and are not preferred.

In the case of the preferred extrusion process, a melt corresponding to the composition of the polymer is extruded from a die, removed, biaxially stretched, optionally heat-set, optionally post-treated and then wound up. If a multi-layer film is to be produced, this can be effected, for example, via the known processes for co-extrusion coating or in-line or off-line coating. The film can be extruded as a flat sheeting or as a tubing (tubular films).

To produce a substantially amorphous PENBB film, the latter is expediently placed on a chill roll or, for example, fed into a chilling bath immediately after its extrusion from a sheet die. Amorphous films of this type are transparent and their densities are lower than those of the crystalline films.

In order to produce rigid, strong, biaxially oriented films of the present invention, the extruded amorphous films are stretched. In the case of biaxial stretching, it is possible to carry out the relevant stretching operations successively, starting with transverse stretching or longitudinal stretching as desired, or simultaneously. In some cases it can prove expedient to follow an initial longitudinal and/or transverse stretching, carried out simultaneously or successively, with one or more further longitudinal and/or transverse stretchings; the latter can also be carried out successively or simultaneously. Relaxation steps, in which the film is again shrunk to some extent in a targeted manner, can also be inserted between these individual stretching steps.

After the stretching operation is complete, it is preferable to set the film by keeping it dimensionally stable at elevated temperatures or allowing only a slight shrinkage (heat-setting). The film crystallizes during setting. If the film does not contain any pigments in high concentration, this film is still transparent following orientation. The density, however, is higher than that of the amorphous film. Preferably, the longitudinal and transverse stretchings both are carried out at a temperature which is between the glass transition temperature and about 30° C. above the cold crystallization temperature. Both temperatures can be determined, for example, by means of DSC (differential scanning calorimetry), a procedure well known to those skilled in the art.

The stretching ratios both in the longitudinal direction and in the transverse ($\lambda_{l\ or\ t}$) direction are between $\lambda_{l\ or\ t}$=1:1.1 and $\lambda_{l\ or\ t}$=1:10, preferably between $\lambda_{l\ or\ t}$=1:2 and $\lambda_{l\ or\ t}$=1:5. The product of total longitudinal stretching and total transverse stretching ($\lambda_{l\times t}$) is preferably between $\lambda_{l\times t}$=1:4 and $\lambda_{l\times t}$=1:20. The biaxially oriented PENBB films of this invention have a birefringeance value Δn of less than 0.2, and preferably Δn is 0.0 to 0.1. The birefringeance Δn is the absolute value of the difference between the maximum and minimum refraction indices measured in the film level and can be determined by means of customary devices, such as an Abbe refractometer, an optical bench or compensation wedges. Determining the birefringeance of a film is within the routine skill of those skilled in the art. For some applications it is advisable also to subject the film to posttreatment, such as corona, plasma or flame treatment, before winding up.

The total thickness of the biaxially oriented films according to the invention depends on the particular intended application, and usually is between 0.05 and 500 μm. Monofilms having a total thickness within the range of 3 to 20 μm, preferably within the range of 5 to 15 μm, have proved appropriate, especially for use as magnetic tape film. Thicknesses within the range of 0.05 to 12 μm, preferably 0.1 to 6 μm, and more preferably 0.5 to 4 μm, are suitable for use as capacitor dielectric. Thicknesses within the range of 15 to 400 μm, and preferably 24 to 350 μm, are suitable for use as electrical insulating film.

The biaxially oriented films according to the invention, in particular those having a bibenzoate content of >25 mol %, preferably of 35 to 60 mol %, and more preferably of 40 to 60 mol %, are characterized by high rigidity, i.e. a high value for the modulus of elasticity, both in the transverse and in the longitudinal direction. In particular, the sum of the values for the modulus of elasticity in the longitudinal and in the transverse direction is greater than 10 GPa, preferably greater than 12 GPa. At the same time, they are also exceptionally stable to heat, i.e. the melting points ($T_m$) are above 260° C., in particular in the range from 270° C. to 360° C.; the glass transition temperature is above 120° C., in particular in the range from 120 and 140° C. The permeability to oxygen is in the range of $$\leq 50 \frac{cm^3}{m^2 \cdot d \cdot bar}$$

(measured according to DIN 53380, at 53% relative humidity and 23° C., using a 12 μm thick film), and in particular it is between 10 and 30 $CM^3/d^2 \cdot d \cdot bar$. The water absorption (measured at 50% relative humidity and 23° C.) is less than 0.1%, in particular less than 0.06%. Up to temperatures of 165° C., the maximum of the curve representing the dielectric loss factor does not exceed $1.2 \cdot 10^{-2}$, in particular $1.0 \cdot 10^{-2}$ (measured at 1 kHz). After irradiation with UV light for 14 days, films according to the invention still possess at least 50%, in particular 60 to 70%, of their initial tear strength, whereas a PET film of the same thickness is completely destroyed at the end of the test period. Films having this combination of characteristics are unique. None of the films disclosed hitherto has the abovementioned combination of characteristics.

Due to their properties, the biaxially oriented films according to the invention are suitable, for example, as carriers for magnetic recording materials, such as video, audio and computer tapes, floppy disks etc. In this case it is in particular the improved rigidity (higher modulus of elasticity) which is noticeable and which is reflected in improved running (of the tape) and less damage to the tape.

The films of the invention also are useful as capacitor dielectrics. In addition to the improved rigidity, which contributes to reduced tearing in production, the increased thermal stability and the low dielectric loss factor even at elevated temperatures is noticeable as having a beneficial effect; the films are able to withstand the soldering bath.

The films of the invention are further useful as sails or sail windows; optionally in the form of a laminate with other films and/or woven materials. The rigidity and the good stability to UV light is of importance for this application.

Packaging materials can be made from the film of the present invention. The low permeability to gas is of particular importance for packaging applications. The films are stable to hydrolysis (low water absorption), and because of their high thermal stability, can be sterilized. Moreover, the improved stability to UV light is of decisive importance for this application.

Films in the graphic sector, as overhead sheets or drafting materials also can be made from the films of the present invention. The films according to the invention are dimensionally stable, resistant to heat (exposure to light) and are clear. The writing films also are useful as electrical insulating materials. Films which are stable to heat and give good electrical insulation such as those of the present invention usually are required for electric motors and transformers.

Parting films and supports for flexible printed circuits also can be made from the films of the present invention. The good resistance of the films according to the invention to heat and chemicals is advantageous for this field of application.

The invention is explained in more detail below by way of examples.

The following test methods were used to determine the characteristics of the films:

Measurement Methods

Amorphous samples are required for determination of $T_g$ and the exothermic peak temperature ($T_{cc}$) by means of DSC. On first heating at a heating rate of 20° K./min, a stepwise increase in the heat capacity occurs at $T_g$. Above $T_g$ exothermic cold crystallization takes place at $T_{cc}$.

Densities were determined in accordance with the procedures of ASTM D1505-68 by dipping samples in density gradient acids. Either mixtures of $CCl_4$/heptane or aqueous $ZnCl_2$ solutions were used to prepare the density gradient acids.

The mechanical properties were determined via a tensile test on film strips 100 mm×15 mm in size. The modulus of elasticity was determined by applying tension at a rate of 10%/min between 0.4 and 0.6% elongation. The tear strength and elongation at break were measured by applying tension at a rate of 100%/min.

The cloudiness was determined in accordance with test standard ASTM-D1003-61, Method A (enlarged measurement angle).

EXAMPLE 1

Dimethyl 2,6-naphthalenedicarboxylate, (289 parts by weight), 322 parts by weight of dimethyl 4,4'-bibenzoate, 368 parts by weight of ethylene glycol and 0.7 parts of manganese acetate tetrahydrate were initially introduced into a conventional polycondensation reactor provided with a blanketing gas line (N2), pressure equalization, a thermometer, a condenser, a vacuum connection and a stirrer. The mixture was heated at 220° C. for 2.5 hours, during which time methanol was distilled off. Triphenyl phosphate (0.675 parts by weight), and 0.2259 part by weight of antimony trioxide then were added as polycondensation catalysts and the mixture was heated to 270° C., with stirring. Vacuum was applied and the temperature was raised to 285° C. and maintained for 2.5 hours. A portion of the copolyester thus obtained was removed from the reactor in the form of melt as a bubble under nitrogen pressure and solidified as a thin, clear, amorphous film. A glass transition temperature ($T_g$) of 123° C. and a cold crystallization temperature ($T_{cc}$) of 132° C. were determined for the film by means of DSC.

The residual melt was granulated and the granules were white, opaque and crystalline. An i.v. value of 0.56 dl/g was determined for the granules (measured at a concentration of 0.1 g/ml in pentafluorophenol and hexafluoroisopropanol [volume ratio 1:1] at 25° C.).

The granules were further condensed for 20 hours at 240° C. under vacuum in the solid phase. After this treatment, the i.v. value was 1.1 dl/g. As expected, no $T_g$ or $T_{cc}$ was discernable in the DSC recording for the crystalline granules condensed in the solid phase; the melting point ($T_m$) was 281° C.

EXAMPLE 2 (pre-film)

The PENBB granules from Example 1 having a melting point of 281° C. were melted in a single screw extruder at temperatures of 280 to 320° C. and extruded through a sheet die onto a chill roll temperature-controlled at 20° C. A 120 μm thick film was obtained which was clear and transparent. Its density was 1.312 $g/cm^3$ and its i.v. value was 0.78 dl/g. The mechanical properties were:

|  | Longitudinal | Transverse |
| --- | --- | --- |
| Elasticity: | 2.1 GPa | 2.1 GPa |
| Tear Strength: | 74 MPa | 74 MPa |
| Elongation at Break: | 251% | 247% |

EXAMPLE 3

The PENBB prefilm from Example 2 was simultaneously biaxially oriented at 135° C. to four by four times its original length and width using a simultaneous film-stretching device. The density was 1.313 g/cm³. The film thickness was 8 μm and the film was clear and transparent. The mechanical properties were:

|  | longitudinal | transverse |
| --- | --- | --- |
| Modulus of elasticity: | 5.8 GPa | 5.1 GPa |
| Tear strength: | 154 MPa | 198 MPa |
| Elongation at break: | 19% | 44% |

EXAMPLE 4

PENBB film from Example 4 was clamped in a tenter frame and heat-treated at 260° C. for 10 min. The film remained transparent (turbidity 3.7%) and its density was 1.330 g/cm³. The mechanical properties were:

|  | longitudinal | transverse |
| --- | --- | --- |
| Modulus of elasticity: | 8.9 GPa | 8.1 GPa |
| Tear strength: | 204 MPa | 256 MPa |
| Elongation at break: | 13% | 38% |

EXAMPLE 5

The PENBB pre-film from Example 2 was sequentially biaxially oriented (first transversely then longitudinally: 3.5×3.5) at 140° C. on a film-stretching device. An 8 μm thick, clear film was obtained. The film was clamped in a tenter frame and heat-treated at 260° C. for 10 min. Its density was 1.343 g/cm³. The mechanical properties were:

|  | longitudinal | transverse |
| --- | --- | --- |
| Modulus of elasticity: | 8.9 GPa | 8.1 GPa |
| Tear strength: | 204 MPa | 256 MPa |
| Elongation at break: | 13% | 38% |

It can be seen from the foregoing Example that films made in accordance with the present invention, even when biaxially oriented, have excellent properties, improved rigidity and resistance to heat.

The present invention has been described in detail with reference to preferred embodiments. Those skilled in the art recognize that various modification can be made without departing from the spirit and scope thereof.

What is claimed is:

1. A biaxially oriented film having at least one layer and a total thickness of 0.05 to 500 μm, comprising a copolyester, which has at least one unit of the formula as a recurring unit derived from dicarboxylic acid, said recurring unit making up from about 40 to about 60 mol % of the recurring units derived from dicarboxylic acid which are present in the copolyester and wherein the birefringeance value Δn is <0.2, and the inherent viscosity value of the copolyester is >0.5 dl/g, wherein the copolyester further has one or more recurring units selected from the formulae consisting of and as recurring units derived from dicarboxylic acid.

2. The biaxially oriented film as claimed in claim 1, wherein the co-polyester contains less than 10 mol % based on the recurring units derived from dicarboxylic acid which are present in the copolyester of recurring units of the formula 3. A process for the production of a biaxially oriented film as claimed in claim 1, comprising the steps of:

a) extruding a copolyester of formula wherein the copolyester further has one or more recurring units selected from the formulae and as recurring units derived from dicarboxylic acid, the recurring unit of the formula making up from about 40 to about 60 mol % of the recurring units derived from dicarboxylic acid which are present in the copolyester, and 0 to 10% by weight of additives through a die;

b) chilling said copolyester to produce a film;

c) stretching said film of step b) simultaneously or successively longitudinally and transversely to the direction of transport; and d) heat-setting said film of step c).

4. The biaxially oriented film as claimed in claim 1, wherein the aromatic ring systems are monosubstituted, disubstituted or polysubstituted by one or more radicals selected from the group consisting of $C_{1-6}$-alkyl, halogen, CN, $NO_2$, $CF_3$, $C_{1-5}$-alkoxy and phenyl.

5. The biaxially oriented film as claimed in claim 1, further comprising particles in one or more layers.

6. The biaxially oriented film as claimed in claim 5, wherein said particles have a size within the range of 0.001 to 10 μm.

7. The biaxially oriented film as claimed in claim 5, wherein the particles are present in an amount of 0.01 to 1% it by weight based on the total weight of the layer.

8. The biaxially oriented film as claimed in claim 5, wherein said particles are selected from the group consisting of: kaolin; talc; $SiO_2$; $MgCO_3$; $CaCO_3$; $BaCO_3$; $CaSO_4$; $BaSO_4$; $Li_3PO_4$; $Ca_3(PO_4)_2$; $Al_2O_3$; LiF; Ca, Ba, Zn or Mn salts of terephthalic acid; carbon; and mixtures thereof.

9. The biaxially oriented film as claimed in claim 1, wherein said film is in the form of a flat film.

10. The biaxially oriented film as claimed in claim 1, wherein said film is in the form of a tubular film.

11. The biaxially oriented film as claimed in claim 1, wherein said film is heat-set.

12. The biaxially oriented film as claimed in claim 1, wherein the density of said film is in the range from 1.28 to 1.37 g/cm$^3$.

13. The biaxially oriented film as claimed in claim 1, wherein said film is crystalline.

14. A biaxially oriented film as claimed in claim 1, comprising a carrier for magnetic recording media.

15. A biaxially oriented film as claimed in claim 1, comprising a capacitor dielectric.

16. A biaxially oriented film as claimed in claim 1, comprising a sail or sail window.

17. A biaxially oriented film as claimed in claim 1, comprising a packaging material.

18. A biaxially oriented film as claimed in claim 1, comprising a reprographic film.

19. A biaxially oriented film as claimed in claim 1, comprising an insulating film for transformers, electric motors and cables.

20. A biaxially oriented film as claimed in claim 1, comprising a parting film.

21. A biaxially oriented film as claimed in claim 1, comprising a support for flexible printed circuits.

22. A biaxially oriented film as claimed in claim 1, comprising a film keyboard.

23. A biaxially oriented film having at least one layer, and having a total thickness of 0.05 to 500 μm, at least one layer of this film being comprised of a polymer of the recurring units -(A-B)- and 0 to 10% by weight of additives, the two components A and B being present in the polymer in approximately equal molar proportions, wherein component A contains:

from about 60 to about 40 mol % of the recurring unit of the formula I (I)

from about 40 to about 60 mol % of the recurring unit of the formula II (II)

and

0 to 10% of one or more recurring units A' selected from the group consisting of -continued and C$_{1-6}$alkyldicarboxylic acids,
with the proviso that the sum of the constituents of the formulae I, II and A' does not exceed 100 mol %,
and component B contains:
90 to 100 mol % of recurring units of the formula III
(III) —O—(CH$_2$)$_n$—O—
where n is an integer from 2 to 6 and
0 to 10 mol % of one or more recurring units B', selected from the group consisting of
—O(CH$_2$)$_m$—O—, where m is an integer of 2 to 6 and m≠n;

where r is an integer of 2 to 6;

endo and/or exo where R is H or C$_{1-4}$alkyl, where X is —CH$_2$—, —C(CH$_3$)$_2$—, —O—, —C(CF$_3$)$_2$—, —S— or —SO$_2$—; and and wherein said polymer further comprises 0 to 10 mol % of a recurring unit C selected from the group consisting of:

and hydroxy-C$_{1-6}$alkylcarboxylic acids, in each case one recurring unit C replacing one recurring unit A and one recurring unit B.

24. The biaxially oriented film as claimed in claim 23, wherein n is 2.

25. The biaxially oriented film as claimed in claim 23, wherein m is an integer within the range of 2 to 4 and r is an integer within the range of 2 to 4.

26. A biaxially oriented film containing polyethylene naphthalate bibenzoate, which has a T$_m$ value in the range from 270 to 360° C., a sum of the values for the modulus of elasticity in the longitudinal and in the transverse direction of ≧10 GPa and a T$_g$ value of at least 120° C.

27. The biaxially oriented film as claimed in claim 26, said film comprising only one layer which further contains processing auxiliaries or lubricants in amounts of up to 1% by weight.

* * * * *